3,838,113
MALEIC ANHYDRIDE COPOLYMER
Robert Victor Smallman, Blackley, England, assignor to Imperial Chemical Industries Limited, London, England
No Drawing. Filed June 9, 1972, Ser. No. 261,393
Claims priority, application Great Britain, June 28, 1971, 30,263/71
Int. Cl. C08f 15/36
U.S. Cl. 260—78.5 R    8 Claims

ABSTRACT OF THE DISCLOSURE

1:1 Alternating copolymers of maleic anhydride and tetrahydrophthalic anhydride or a homologue thereof and a process for the manufacture of these copolymers. The products are soluble in water with hydrolysis and are useful as emulsifying agents, sizes, water-softening agents, metal ion chelating agents and in detergent compositions as soil-suspending or anti-redeposition agents and as builders.

---

This invention relates to new copolymers of maleic anhydride and to a process for preparing such copolymers.

Maleic anhydride contains an electron deficient double bond and it readily copolymerises with unsaturated compounds containing an electron-rich double bond, for example, styrene or a vinyl ether. It can only be copolymerised with great difficulty with compounds containing an electron deficient double bond.

We have now discovered that a useful copolymer can be readily prepared by reacting maleic anhydride with tetrahydrophthalic anhydride, or a homologue thereof, which compound also contains an electron-deficient double bond. For reasonable yields much larger quantities of a reaction initiator are required than are normally used in the preparation of maleic anhydride copolymers.

Thus the copolymer of this invention is a 1:1 alternating copolymer of maleic anhydride and tetrahydrophthalic anhydride or a homologue thereof, having the following general formula:

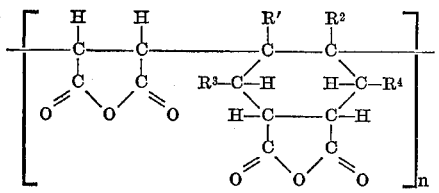

wherein $R'$, $R^2$, $R^3$ and $R^4$ each represent hydrogen or an alkyl group or $R^3$ and $R^4$ together represent a methylene bridge, and $n$ is the degree of polymerisation.

Tetrahydrophthalic anhydride is a commercially available substance, normally prepared by the Diels-Alder reaction of butadiene and maleic anhydride. Homologues may be prepared from appropriately substituted butadiene and homologues thereof having a methylene group bridging the 3,6 positions. For example, endomethylene tetrahydrophthalic anhydride, may be prepared from a cyclopentadiene.

In accordance with the process of the invention, these copolymers are produced by the reaction of maleic anhydride and tetrahydrophthalic anhydride, or a homologue thereof in substantially equimolar proportions at an elevated temperature in the presence of a free radical producing initiator. The reaction is preferably carried out in liquid phase, using molten reactants or using solvent for the reactants which may be either a solvent for the copolymer, for example, methyl ethyl ketone, or a non-solvent for the copolymer, for example, toluene or diethyl benzene.

Preferably the initiator is present in an amount in excess of 1% of the total weight of the reactants. Large quantities of initiator are advantageous for increasing the reaction rate and producing high yields of copolymer. However, it is not generally desirable to use amounts in excess of 25% by weight of the reactants, as the reaction rate may become dangerously fast. The initiator may all be added initially to the reaction mixture, or it may be added in portions or continuously throughout the reaction.

The preferred free radical producing initiators are organic peroxy compounds such as, for example, diacyl peroxides, per-esters, ketone peroxides, alkyl peroxides, hydroperoxides and percarbonates. Convenient initiators include benzoyl peroxide, lauroyl peroxide and t-butyl peroctoate.

The reaction is preferably carried out at a temperature whereat the decomposition half-life of the initiator is not more than one hour. This will generally be within the range 50 to 200° C.

The process may be conveniently carried out as a batch process, but it could readily be operated as a continuous process, with the reactants and initiator being continuously fed to a reaction zone and copolymer being continuously withdrawn.

The copolymers of the invention are soluble in water with hydrolysis to give acidic solutions. They are useful in many applications either per se or neutralised with amines or alkali metal hydroxides, but they are particularly useful as emulsifying or suspending agents, sizes, water-softening agents, metal ion chelating agents, and, in detergent compositions, as soil-suspending or anti-redeposition agents and as detergent "builders." The chelating abilities of these copolymers are surprisingly good and the particularly effective chelation of calcium ion indicates the particular suitability of the copolymers for use in water-softening and detergent "builder" applications.

The invention is further illustrated by the following Examples wherein all parts and percentages are by weight.

Example 1

49 parts of maleic anhydride and 71 parts of tetrahydrophthalic anhydride were melted together and stirred under nitrogen at 90° C. 10.6 parts benzoyl peroxide plasticised with 7.1 parts of dimethyl phthalate were added in one portion and the mixture stirred for two hours. The melt, which had then become purple coloured and viscous, was poured into 3 litres of toluene to give a granular precipitate. The precipitate was filtered off, dissolved in methyl ethyl ketone, and reprecipitated in 3 litres of toluene. The fine precipitate thus obtained, was filtered off and dried in a vacuum oven at 80° C. for 14 hours.

44.6 parts (37.2% yield) of copolymer was obtained as a light purple coloured fine powder. A 1% solution of the copolymer in methyl ethyl ketone had a relative viscosity of 1.030 at 20° C. The copolymer contained 55.65% C and 4.08% H. A 1:1 copolymer of maleic anhydride and tetrahydrophthalic anhydride, $(C_{12}H_{10}O_6)_n$, requires 57.6% C and 4.03% H.

The chelation binding power of the copolymer with calcium ion, measured by a turbidimetric titration of a polymer solution with calcium acetate at pH 10, was 968 mg. calcium acetate/g., compared to a value of 187 mg. for sodium citrate, 387 mg. for sodium tripolyphosphate and 830 mg. for nitrilo-triacetic acid, which are compounds used as sequestering agents and detergent "builders."

Example 2

49 parts of maleic anhydride and 71 parts of tetrahydrophthalic anhydride, were melted at 100° C. and 9.9 parts benzoyl peroxide plasticised with 6.6 parts of dimethylphthalate were added in one portion. A vigorous exothermic reaction ensued with a maximum temperature of 185° C. being attained. After two hours, the product was isolated as described in Example 1, to give 40 parts (33.3% yield) of copolymer in the form of a beige powder. A 1% solution of the copolymer in methyl ethyl ketone had a relative viscosity of 1.026. The copolymer cotained 56.7% C and 4.15% H.

The chelation binding power was 913 mg. calcium acetate /g.

Example 3

49 parts of maleic anhydride and 71 parts of tetrahydrophthalic anhydride were melted at 90° C. 10.6 parts of benzoyl peroxide plasticised with 7.1 parts of dimethylphthalate were added in four equal portions at one hour intervals with stirring under nitrogen. A maximum temperature of 92.5° C. was attained. The reaction was allowed to proceed for a total of 5½ hours and the copolymer product isolated as in Example 1.

62.3 parts (51.9% yield) of copolymer, in the form of a light purple powder, were obtained. A 1% solution of the copolymer in methyl ethyl ketone had a relative viscosity of 1.032 at 20° C. The copolymer contained 55.85% C and 4.06% H.

The chelation binding power was 968 mg. calcium acetate/g.

Example 4

49 parts of maleic anhydride and 71 parts of tetrahydrophthalic anhydride were melted under nitrogen and stirred at 92° C. 10 parts of t-butyl peroctoate were added in four equal portions at half hour intervals. A maximum temperature of 96.5° C. was attained. After a total reaction period of 2½ hours the copolymer product was isolated as in Example 1, except that 50 ml. of methyl ethyl ketone was added to the melt before the first toluene precipitation step, to assist pouring. 45.2 parts (37.7% yield) of copolymer was obtained as a white powder. A 1% solution of the copolymer in methyl ethyl ketone had a relative viscosity of 1.041. The copolymer contained 56.0% C and 4.65% H.

The chelation binding power of the copolymer was 1040 mg. calcium acetate/g.

Example 5

49 parts of maleic anhydride and 71 parts of tetrahydrophthalic anhydride were melted together and stirred under nitrogen at 80° C. and 18 parts of lauroyl peroxide were added in four equal portions at half hour intervals. After a total reaction time of 2½ hours, the copolymer product was isolated as described in Example 4. 25.9 parts (20.8% yield) of copolymer, in the form of a light orange-brown powder, were obtained. A 1% solution of the copolymer in methyl ethyl ketone had a relative viscosity of 1.033. The copolymer contained 56.95% C and 5.35% H.

The chelation binding power of the copolymer was 925 mg. calcium acetate/g.

Example 6

47.8 parts of maleic anhydride and 81 parts of endomethylene tetrahydrophthalic anhydride were melted together under nitrogen at 90° C. 10.6 parts of benzoylperoxide plasticised with 7.1 parts of dimethylphthalate were added in four equal portions at half hour intervals to the stirred melt. After a total reaction time of 2½ hours, the viscous dark-brown liquid was dissolved in 50 ml. methyl ethyl ketone and the copolymer product was isolated as described in Example 4 to give 35.8 parts (27.8% yield) of copolymer in the form of a dark grey powder. 1% solution of the copolymer in methyl ethyl ketone had a relative viscosity of 1.024. The copolymer contained 59.9% C. and 4.07% H. A 1:1 copolymer of maleic anhydride and endomethylene tetrahydrophthalic anhydride, $(C_{13}H_{10}O_6)n$, requires 59.54% C and 3.84% H.

The chelation binding power of the copolymer was 700 mg. calcium acetate/g.

Example 7

49 parts of maleic anhdyride and 83 parts of 4-methyltetrahydrophthalic anhydride were melted together with stirring at 90° C. under nitrogen. 10.6 parts of benzoyl peroxide plasticised with 7.1 parts of dimethylphthalate were added in four equal portions at half-hour intervals and after a total reaction time of 2½ hours, the copolymer product was isolated as described in Example 4.

63.1 parts (47.8% yield) of copolymer in the form of a light purple powder were obtained. A 1% solution of the copolymer in methyl ethyl ketone had a relative viscosity of 1.036. The copolymer contained 57.25% C and 4.65% H. A 1:1 copolymer of maleic anhydride and 4-methyltetrahydrophthalic anhydride, $C_{13}H_{12}O_6$, requires 59.009% C and 4.58% H.

The chelation binding power of the copolymer was 700 mg. calcium acetate/g.

Example 8

24.5 parts of maleic anhydride and 71 parts of tetrahydrophthalic anhydride were dissolved in 100 parts of methyl ethyl ketone, 18 parts of lauroyl peroxide were added and the solution stirred for 5 hours at 80° C. The solution was poured into toluene and the copolymer product was isolated as described in Example 1. 12.4 parts (20% yield) of copolymer were obtained in the form of a dark red powder. A 1% solution in methyl ethyl ketone had a relative viscosity of 1.032. The copolymer contained 56.7% C and 5.16% H.

The chelation binding power of the copolymer was 920 mg. calcium acetate/g.

Example 9

24.5 parts of maleic anhydride and 35.5 parts of tetrahydrophthalic anhydride were dissolved in 280 ml. of toluene under nitrogen, 5.4 parts of benzoyl peroxide plasticised with 3.6 parts of dimethylphthalate were added and the mixture stirred at 85° C. for six hours. The toluene was then decanted off leaving a solid precipitate of copolymer which was dissolved in methyl ethyl ketone, reprecipitated from toluene and dried in a vacuum oven at 80° C. 11.4 parts (19,% yield) of copolymer, in the form of a pink powder, were obtained. A 1% solution in methyl ethyl ketone had a relative viscosity of 1.030. The copolymer contained 55.5% C and 4.44% H.

The chelation binding power of the coplymer was 835 mg. calcium acetate/g.

We claim:

1. A water-soluble 1:1 alternating copolymer of maleic anhydride and tetrahydrophthalic anhydride or a homologue thereof, having the general formula

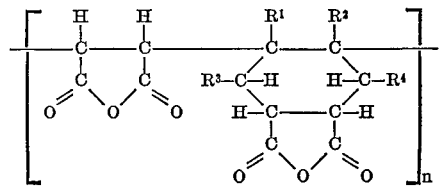

wherein $R^1$, $R^2$, $R^3$ and $R^4$ each represent a hydrogen atom or an alkyl group or $R^3$ and $R^4$ together represent a methylene bridge, and $n$ is the degree of polymerisation.

2. A process for the manufacturue of the copolymer claimed in Claim 1 which comprises the reaction of maleic anhydride and tetrahydrophthalic anhydride or a homologue thereof in substantially equimolecular proportions at an elevated temperature in the presence of a free radical-producing initiator.

3. A process as claimed in Claim 2 wherein the reaction is carried out using the molten reactants in the absence of a solvent.

4. A process as claimed in Claim 3 wherein the initiator is employed in an amount from 1% to 25% by weight based on the total weight of the reactants.

5. A process as claimed in Claim 4 wherein the free radical-producing initiator is an organic peroxy compound.

6. A process as claimed in Claim 5 wherein the organic peroxy compound is benzoyl peroxide, lauroyl peroxide or *tert.* butyl peroctoate.

7. A process as claimed in Claim 6 wherein the reaction is carried out at a temperature in the range of 50 to 200° C.

8. A process as claimed in Claim 7 wherein the reaction is carried out at a temperature in the range 50 to 200° C.

References Cited
UNITED STATES PATENTS

| | | | |
|---|---|---|---|
| 2,359,038 | 9/1944 | Hopff et al. | 260—78 |
| 2,560,119 | 7/1951 | McCaslin et al. | 260—78.4 |
| 3,385,834 | 5/1968 | Merijan | 260—78.4 |

JOSEPH L. SCHOFER, Primary Examiner

J. KIGHT III, Assistant Examiner

U.S. Cl. X.R.

252—89, 175, Dig. 11, Dig. 15; 260—78.5 T